April 29, 1924.
A. F. DECKER
PRINTER'S BLANKET
Filed Dec. 1 1922
1,492,123
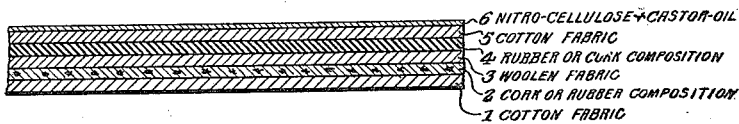
6 NITRO-CELLULOSE+CASTOR-OIL
5 COTTON FABRIC
4 RUBBER OR CORK COMPOSITION
3 WOOLEN FABRIC
2 CORK OR RUBBER COMPOSITION
1 COTTON FABRIC
INVENTOR
Ammiel F. Decker,
BY Hartwell McCartney
ATTORNEY Patented Apr. 29, 1924.

1,492,123

UNITED STATES PATENT OFFICE.

AMMIEL F. DECKER, OF PELHAM, NEW YORK.

PRINTER'S BLANKET.

Application filed December 1, 1922. Serial No. 604,217.

*To all whom it may concern:*

Be it known that I, AMMIEL F. DECKER, a citizen of the United States, residing at Pelham, in the county of Westchester and State of New York, have invented certain new and useful Improvements in Printers' Blankets, of which the following is a specification.

The present invention relates to printers' blankets; and it resides in the provision of an improved article of the class indicated having a maximum resiliency, so that it may bend or flex to the necessary or desired degree without danger of its surface breaking or cracking.

The invention further resides in the provision of a blanket of the above character which is made up of several layers or laminæ, including a central layer of woven or felted woolen fabric and facing layers connected thereto by suitable composition layers, one of which facing layers has an ink-repellant coating applied to it. The composition layers, or either of them, may be made so thick that it is possible to use a single blanket on the press cylinder, instead of two, as has heretofore been necessary.

The accompanying drawing shows a fragmentary cross-sectional view of a printer's blanket embodying the invention.

In carrying out my invention, I start with a sheet-like base, body, or other supporting member 1 constituting the lower facing layer and made of heavy woven cotton fabric, preferably about .010 in. thick; and on this member I apply or form a composition layer 2 which may be either rubber or cork. The rubber composition may advantageously consist of a benzol solution of mixed rubber treated with sulfur; and the cork composition may consist of ground cork, linseed or castor oil, gum kauri and rosin, preferably in the proportion of 26 parts of the ground cork to 20 parts of the oil, 1 part of the gum and 3 parts of the rosin, although such proportions may, of course, be varied.

Over the previously-described composition layer 2, whether rubber or cork, and which preferably will have a thickness of .020 in., I place another fabric sheet or layer 3; this layer 3 being made of woven or felted woolen fabric, about .020 in. thick. I then form, spread or otherwise apply a second composition layer 4 which may likewise have either a cork or a rubber base, as before, and a thickness of .020 in.; and on top of this second composition layer 4 I deposit the top facing layer 5 of woven cotton or woolen fabric; the layer 5 having an ink-repellant coating 6 applied to its outer face. The coating 6 may consist of a solution of nitrocellulose in ethyl alcohol, mixed with castor oil, in which latter suitable pigments or other coloring materials have been ground. The proportions which now seem most satisfactory, but which may be varied, are: nitrocellulose (nitrated cotton) 1 lb.; ethyl acetate, 1 gal.; castor oil, 8 oz. Several coats of this solution are applied; but in the top coats, the oil is preferably omitted, and the nitrocellulose solution has incorporated in it about 10% of dry bronze or other metal powder. I now consider it advisable to form the ink-repellant surface coating in this way; but I may, if preferred, construct a film of the solution having somewhat the structural character of a cinematograph film, and affix it to the cotton or woolen layer 5 in any desired manner.

In practice, I prefer to form the lower composition layer 2 on the base facing layer 1 of cotton fabric, then apply the central woolen layer 3, and then join the three layers together by passing them between pressing rollers of suitable character. I then successively apply the second composition layer 4 and the top layer 5, and then pass the composite article thus formed between the pressing rollers, thereafter applying the ink-repellant coating 6. But if deemed more expedient for any reason, I may coat the top facing layer 5 before combining it with the other layers; and I may proceed in still other ways to combine the various layers.

The thickness of the layers, like the proportions of the ink-repellant solution, may be varied; and I therefore do not limit myself to those given above, nor to the use of two composition layers having the same base, as one layer may have a base of rubber and the other of cork.

Having described my invention, I claim:

1. A printer's blanket, comprising cotton and woolen fabric layers, a composition layer or layers between the fabric layers and connecting them together, and an ink-repellant coating on one of the fabric layers; said coating containing dissolved nitrocellulose, castor oil, and coloring matter.

2. A printer's blanket, comprising cotton and woolen fabric layers, a composition layer or layers between the fabric layers and connecting them together, and an ink-repellant coating on one of the fabric layers; said coating containing dissolved nitrocellulose, castor oil, coloring matter and bronze powder.

3. A printer's blanket, comprising top and bottom facing layers of textile fabric, a central layer of woolen fabric, and layers of cork composition between the central layer and the facing layers and uniting the same together; substantially as described.

4. A printer's blanket comprising two facing layers of woven textile fabrics, at least one of which is composed of wool, with a cork composition between such layers.

5. A printer's blanket comprising two facing layers of woven textile fabrics, at least one of which is composed of wool, with a cork composition between such layers; and an ink repellant coating on one of said layers, said coating containing dissolved nitro-cellulose and castor oil.

6. A printer's blanket comprising top and bottom facing layers of textile fabrics, at least one of which is composed of wool, with a cork composition between such facings.

7. A printer's blanket comprising top and bottom facing layers of textile fabrics, at least one of which is composed of wool, with a cork composition between such facings; and an ink repellant coating on the top facing layer, said coating containing dissolved nitro-cellulose and castor oil.

In testimony whereof I affix my signature.

AMMIEL F. DECKER.